United States Patent
Huang et al.

(10) Patent No.: US 9,104,831 B2
(45) Date of Patent: Aug. 11, 2015

(54) SEMICONDUCTOR OVERLAY PRODUCTION SYSTEM AND METHOD

(71) Applicant: Taiwan Semiconductor Manufacturing Company, Ltd., Hsin-Chu (TW)

(72) Inventors: Po-Chang Huang, Taipei (TW); Ying Ying Wang, Xin-Zhu (TW); Shellin Liu, Hsin-Chu (TW); Kuan-Chi Chen, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/974,295

(22) Filed: Aug. 23, 2013

(65) Prior Publication Data

US 2015/0058817 A1    Feb. 26, 2015

(51) Int. Cl.
*G06F 17/50* (2006.01)

(52) U.S. Cl.
CPC .................................. *G06F 17/5081* (2013.01)

(58) Field of Classification Search
CPC ....... G03F 7/70633; G03F 1/144; G03F 1/36; G03F 7/70533; G03F 1/72; G03F 1/84; G05B 2219/35472; H01L 21/31144; H01L 21/76811

USPC .............................. 716/50, 51, 52, 53, 54, 55
See application file for complete search history.

(56) References Cited

U.S. PATENT DOCUMENTS

| | | | | |
|---|---|---|---|---|
| 5,790,417 A * | 8/1998 | Chao et al. | ...................... | 716/55 |
| 5,798,937 A * | 8/1998 | Bracha et al. | ................... | 716/54 |
| 6,892,365 B2 * | 5/2005 | Culp et al. | ...................... | 716/52 |
| 6,975,974 B2 * | 12/2005 | Chien et al. | ........................ | 703/2 |
| 7,526,749 B2 * | 4/2009 | Levinski et al. | ................ | 716/50 |
| 2003/0022079 A1 * | 1/2003 | Baggenstoss | ................... | 430/30 |
| 2008/0077894 A1 * | 3/2008 | Adel et al. | ........................ | 716/5 |
| 2009/0055794 A1 * | 2/2009 | Kimoto | ........................... | 716/21 |
| 2009/0276745 A1 * | 11/2009 | Nitta | ................................. | 716/6 |
| 2010/0005442 A1 * | 1/2010 | Ghinovker et al. | ............. | 716/21 |
| 2013/0097570 A1 * | 4/2013 | Chen | ............................. | 716/118 |

* cited by examiner

*Primary Examiner* — Thuan Do
*Assistant Examiner* — Brian Ngo
(74) *Attorney, Agent, or Firm* — Slater & Matsil, L.L.P.

(57) ABSTRACT

Disclosed herein is a system and method for producing semiconductor devices using overlays, the method comprising associating one or more patterned overlays with respective ones of reserved regions in a layer template, receiving a layer design based on the layer template, identifying the reserved regions in the layer design, generating a production layer design based on the layer design, the production layer design describing at least one production overlay in one of the reserved regions, and fabricating one or more devices based on the production layer design.

20 Claims, 7 Drawing Sheets

SEMICONDUCTOR OVERLAY PRODUCTION SYSTEM AND METHOD

BACKGROUND

The semiconductor industry continues to improve the integration density of various electronic components (e.g., transistors, diodes, resistors, capacitors, etc.) by continual reductions in minimum feature size, which allow more components to be integrated into a given area. Semiconductor devices are used in a variety of electronic applications, such as personal computers, cell phones, digital cameras, and other electronic equipment, as examples.

Semiconductor devices are typically fabricated by forming an active device in a semiconductor layer and then sequentially depositing insulating or dielectric layers, conductive layers, and the like over the active devices to provide electrical insulation and conductive connections to the underlying active devices. The layers over the active device are patterned using masks for each layer. As each layer is formed, it is aligned with the layer below it to ensure that the mask used to form the layer features, openings or the like in a predefined location in the layer.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to illustrate the relevant aspects of the embodiments and are not necessarily drawn to scale.

DETAILED DESCRIPTION

The making and using of the presented embodiments are discussed in detail below. It should be appreciated, however, that the present disclosure provides many applicable concepts that can be embodied in a wide variety of specific contexts. The specific embodiments discussed are merely illustrative of specific ways to make and use the described semiconductor overlay production system and method.

Embodiments will be described with respect to a specific context, namely making and using overlays useful in, for example, producing semiconductor devices and aligned layers. Other embodiments may also be applied, however, to substrates, packages, structures or devices or combinations of any type of device or component having aligned layers.

The embodiments of the present disclosure are described with reference to FIGS. 1 through 8, and variations of the embodiments are also discussed. Throughout the various views and illustrative embodiments of the present disclosure, like reference numbers are used to designate like elements. Additionally, the drawings are intended to be illustrative, are not to scale and not intended to be limiting. Note that, for simplification, not all element numbers are included in each subsequent drawing. Rather, the element numbers most pertinent to the description of each drawing are included in each of the drawings.

Semiconductor devices are designed using software that generates database files for transferring integrated circuit (IC) layout photomask data. The graphic data system (GDS) file format is one of the most common data formats and is the final output of the in IC design cycle. While other data formats, such as OASIS may be used, the files referred to herein may be referred to GDS files for consistency without limiting the format of files described in embodiments.

GDS files describe multiple layers, with structures spanning different layers being broken into components distributed in the different layers. For example, a metal structure may extend through several layers and have portions of the structure formed as part of different metal layers. Proper and accurate alignment of the portions of the metal structure in each metal level ensures that the metal structure conducts properly through the different layers, with each portion of the structure contacting the metal portions above and below. Similarly, masks used to form or etch layers such as dielectric layers or metal layers are aligned to ensure that the devices and structures in a device are formed properly.

The different layers in a GDS file are represented by overlays defining patterns for masks used to pattern the different layers, for example, by masking and etching, by dual damascene techniques, or the like. The different layers are aligned by forming a feature in a lower layer, and then placing a mask for a higher layer in relation to the metal feature.

Each GDS file has multiple layers that are generally designed by a designer and then sent to a fabrication facility. The fabrication facility uses alignment marks in the GDS file to produce wafer, dies and devices with the features specified in the GDS file. In embodiments of the presented disclosure, the fabrication facility may insert one or more alignment marks into layers in the GDS file to facilitate aligning multiple layers. The fabrication facility provides to a designer a template GDS file with one or more reserved regions in the GDS file where a dummy pattern or overlay may be pre-inserted. The designer uses the template as the basis for the device layout and design, with the reserved areas in the template indicating locations of regions where circuits or devices are prohibited. After receiving the GDS file from the designer, the dummy overlays are replaced with a production overlay. Providing the dummy overlay and then replacing the dummy pattern with the production pattern permits the use of a standard production overlay without the need to track changes across GDS files as the production overlay is revised. Thus, revisions to the standard pattern may be made up until the point where the production patterns are inserted into the GDS file.

A GDS file may have a format abstractly defined as a list of structures, with each structure having boundaries defined for the structure. Additionally, each structure may a list of nested structures referenced therein. The format of the GDS file is in the following format:

| | |
|---|---|
| BGNLIB | start of the so called "library" |
| BGNSTR | begin a structure |
| NAME | the structure's name |
| BOUNDARY | a geometric boundary |
| BOUNDARY | a geometric boundary |
| SREF CELL_A [X,Y,ROT,MIR,MAG] | |
| | a reference placing another structure |
| ENDSTR | end the structure |
| BGNSTR | begin a new structure |
| NAME | the structure's name |
| BOUNDARY | a geometric boundary |
| BOUNDARY | a geometric boundary |
| ENDSTR | end the structure |
| ENDLIB | end the library |

Each structure in the GDS file is assigned to a layer, with one layer potentially having thousands of structures. A GDS file having a single square structure in the fifth layer may look like:

| | |
|---|---|
| BGNLIB | start of the so called "library" |
| BGNSTR | begin a structure |
| NAME=SQUARE | the structure's name |
| BOUNDARY 5 0 | <-- Boundary on layer 5, datatype 0 |
| –50000 –50000 | <-- First X,Y vertex |
| 50000 –50000 | <-- Second X,Y vertex |
| 50000 50000 | <-- Third X,Y vertex |
| –50000 50000 | <-- Fourth X,Y vertex |
| –50000 –50000 | <-- Back to First X,Y vertex |
| ENDEL | |
| ENDSTR | |
| ENDLIB | |

The GDS file may include one or more overlays which are portions of a layer that correspond to a reserved region. Each overlay may be empty, or have one or more features defined therein. Additionally, while data is described herein as being in the GDS file format, the description is intended to be exemplary and not necessarily limiting. It should be understood that embodiments described herein may use any suitable data format, file structure or storage methodology.

Figure 1:
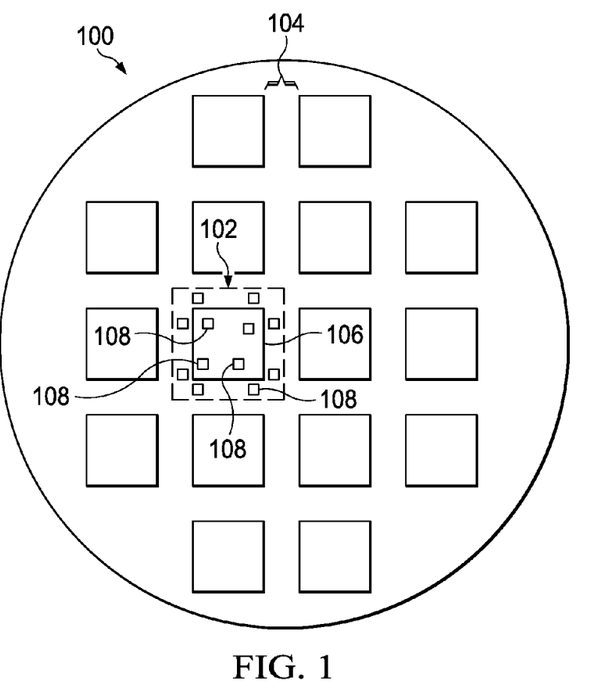
FIG. 1 is a top view of a wafer with dies having alignment regions according to an embodiment.

FIG. 1 is a top view of a wafer 100 having dies 106 having alignment regions 108 according to an embodiment. The alignment regions 108 may correspond to reserved regions in a GDS file. In an embodiment, a wafer 100 has one or more dies 106 separated by scribe lines 104. The scribe lines 104 may have one or more alignment regions 108. Additionally, one or more alignment regions 108 may be "in-chip", or disposed within a die 106.

Figure 2:
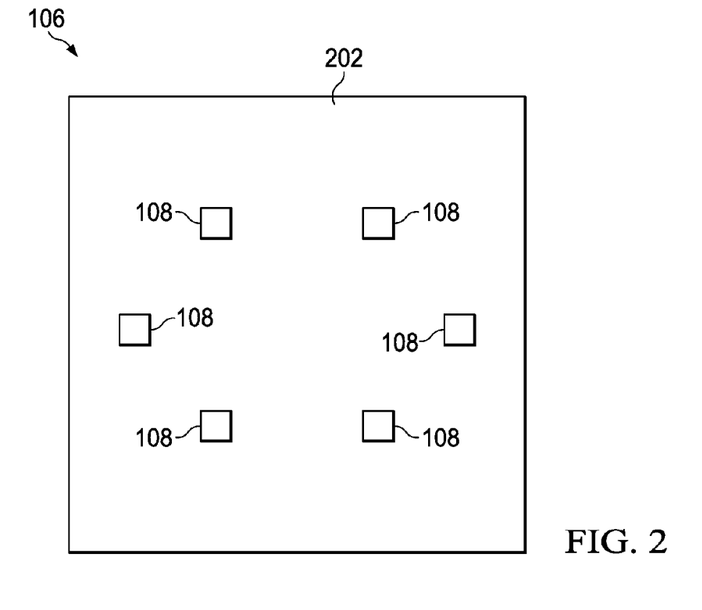
FIG. 2 is a top view of a die having alignment regions disposed therein according to an embodiment.

FIG. 2 illustrates an enlarged view of one of the dies 106 of FIG. 1 according to an embodiment. The die 106 may have one or more alignment regions 108 reserved within a die field 202. The alignment regions 108 may have one or more patterns permitting the alignment of various layers as the die 106 is fabricated. In an embodiment, the alignment regions 108 are reserved for alignment marks or other fabrication related structures. In an embodiment, the alignment regions are defined in the GDS file as a reserved region, and one or more overlays are defined for the reserved regions. The reserved regions may extend through more than one layer, with an overlay in the reserved region of each layer used to align layers relative to each other.

The die 106 is formed forming one or more active devices in a substrate, and then forming one or more layers of, for example, dielectric layers and metal layers, over the active device layer. To form the layers over the active layers, a layer design is used to form a mask. The mask is used, for example, in photolithography, where a photoresist is patterned using light shown through the mask. The photoresist may then be used to pattern a substrate, metal dielectric or the like for implant or etching. The alignment regions 108 are regions in each layer pattern that are reserved for alignment marks are used to align layer masks. A pattern is formed in a layer, and then a mask for a subsequent layer is aligned with the pattern in the previously formed layer. The alignment regions may extend through multiple layers. An overlay is a design in a layer pattern for forming an alignment mark or otherwise reserving the alignment region in a layer pattern. Different overlay patterns are associated with different layer types.

Figure 3A:
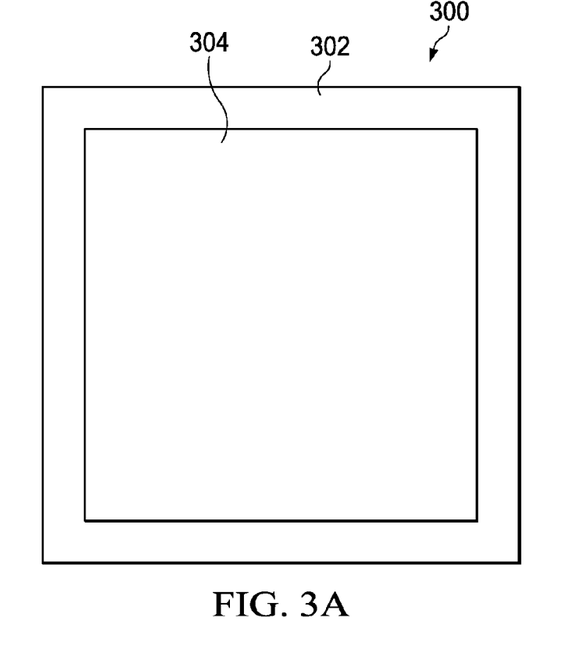
FIGS. 3A and 3B are top views of dummy overlays according to embodiments.

FIG. 3A illustrates a top view of an empty overlay 300 with an empty pattern region 304 according to an embodiment. The empty overlay 300 is a pattern or design used in a reserved region of a layer design that will become an alignment region 108 (See, e.g., FIGS. 1 and 2) when a die 102 is fabricated. The empty overlay 300 may have a metal ring 302 disposed around the edge and defining the pattern region 304. The pattern region 304 is empty of metal features, resulting in an empty dummy pattern. The metal ring 302 prevents infiltration of moisture or other material into the reserved region where the empty pattern region 304 is used in production. In an embodiment, the empty overlay is associated, or used when forming, a non-metal layer such as a dielectric layer, a mask for implanting or the like.

Figure 3B:
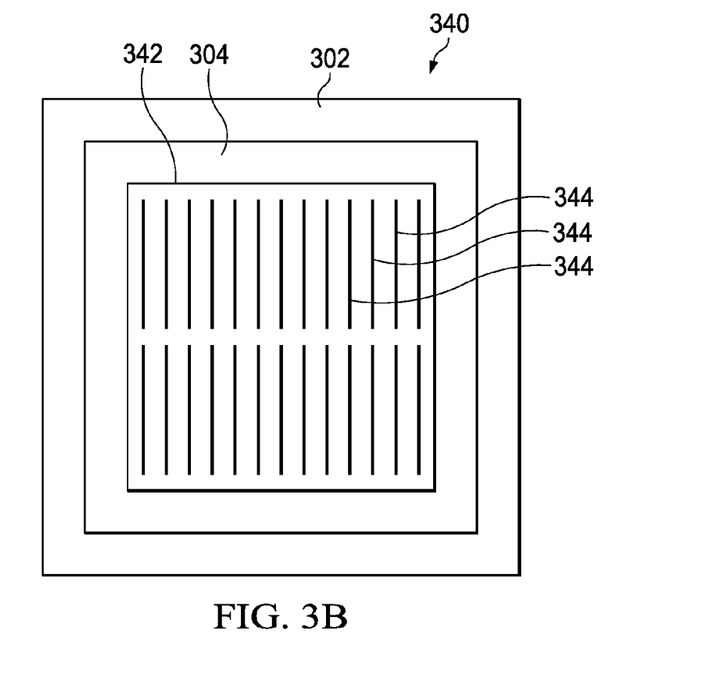

FIG. 3B illustrates a top view of a patterned overlay 340 according to an embodiment. The patterned overlay 340 is another pattern or design used in a reserved region of a layer design that will become an alignment region 108 (See, e.g., FIGS. 1 and 2) when a die 102 is fabricated. A patterned overlay 340 describes a metal dummy pattern 342 comprising one or more metal elements 344 disposed within the pattern region 304. The patterned overlay 340 may be used as a temporary alignment mark placeholder in metal layers, while an empty overlay 300 may be used as the placeholder for non-metal layers. For example, in a GDS file describing a stack of intermetal dielectric layers and associated metal layers, an empty overlay 300 may be used in the reserved region in the intermetal dielectric layers, and a patterned overlay 340 may be used in the reserved region in the metal layers.

Empty overlays 300 and patterned overlays 340 are used in layer designs and are replaced in the layer design with a production overlay 400 (See, e.g., FIG. 4) prior to fabrication. The empty overlays 300 and patterned overlays 340 provide a structure identifying a reserved region in a layer design. Additionally, the use of a patterned overlay 340 with a metal dummy pattern 342 in metal during layer design permits testing of the production metal layers without requiring the production overlay 400. The metal elements 344 of the patterned overlay 340 reproduce the capacitive effects that a production alignment mark would have on the circuitry or elements outside of the reserved region. In an embodiment, the patterned overlay 340 has metal elements 344 that comprise between about 40% and about 60% of the surface area of the reserved region. In an embodiment, the patterned overlay 340 has metal elements 344 that comprise about 50% of the surface area of the reserved region. The surface area occupied by the metal elements 344 is selected to have a metal area similar to a production metal pattern (see, e.g., 342 of FIG. 4) or alignment mark so that when a resistance-capacitance test (RC test) is run on a die design, the test accurately reflects the interaction the circuits or metal structures of the die would have with any production patterns in a reserved region.

Figure 4:
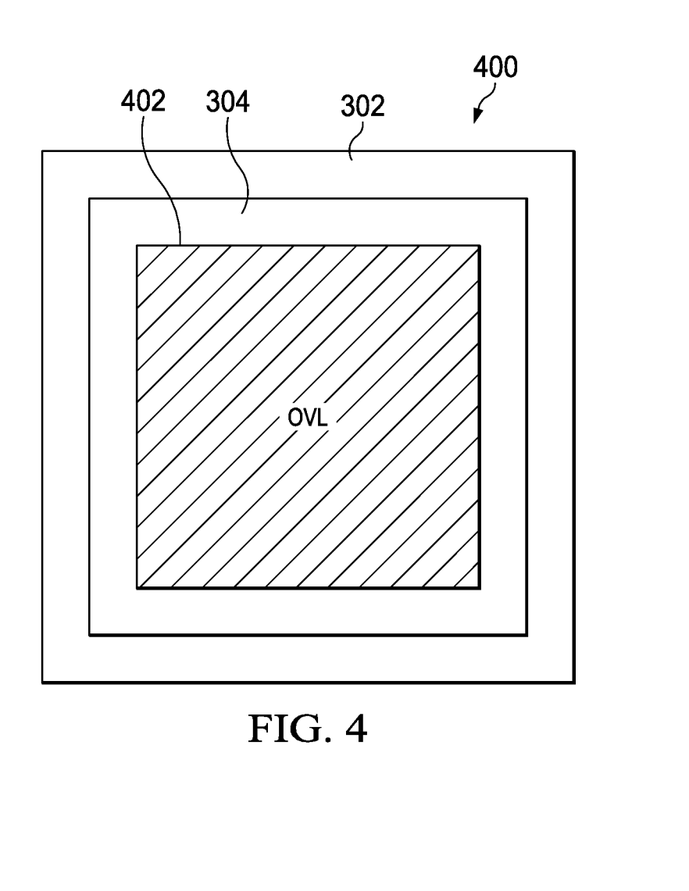
FIG. 4 is a top view of a production overlay according to an embodiment.

FIG. 4 shows a top view of a production overlay 400 according to an embodiment. Production overlays are used in layer designs during production of devices. The production overlays are inserted into the reserved areas of layers designs to replace one or more dummy layers such as patterned overlays 340 (See, e.g., FIG. 3B). The production overlays described a pattern of metal elements that will be fabricated in a layer of a die. A production pattern 402 may have one or more metal elements arranged within the pattern region 304, and bounded by a metal ring 302. In an embodiment, the production pattern 402 has metal elements 404 arranged in a different pattern than the metal dummy pattern 342 (FIG. 3B). It should be noted that the arrangement of metal elements disclosed in FIG. 4 is exemplary, and not intended to be limiting. The arrangement, size and surface area of the metal elements in the production metal pattern 402 may be varied according to the requirements of the die design or production equipment.

The production overlay 400 may be sized according to the requirements of the alignment system, die or fabrication process. In an embodiment, in a 20 nm fabrication process, the reserved region and the production overlay 400 is substantially square, and has sides between about 12 μm and about 14 μm in length. In an embodiment, the production overlay 400 has sides about 12.6 μm in length. In an embodiment, the pattern region 304 has sides between about 10 μm and about 12 μm in length. In an embodiment, the pattern region 400 has sides about 11 μm in length. In an embodiment, the production metal pattern 402 has sides between about 9 μm and about 11 μm in length. In an embodiment, the production metal pattern 402 has sides about 10 μm in length. The empty overlay 300 (See, e.g., FIG. 3A) and patterned overlay 340 (See, e.g., FIG. 3B) may have dimensions corresponding to the production overlay so that when the production overlay 400 replaces the empty overlay 300 or patterned overlay 340, the production overlay 400 is placed within the reserved region without overlying the non-reserved portion of the die field 202 (See, e.g., FIG. 2).

Figure 5:
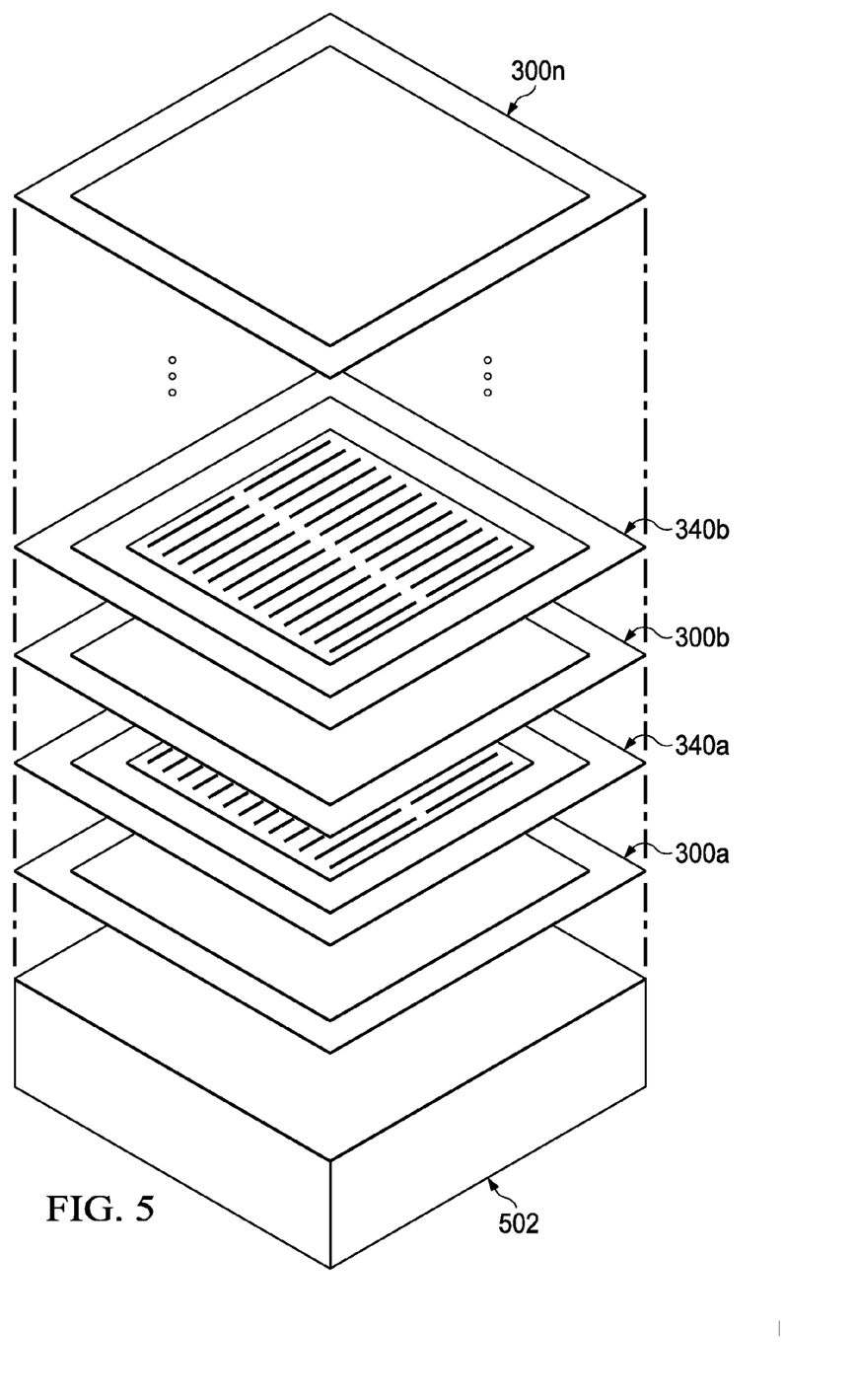
FIG. 5 is a view illustrating arrangement of dummy patterns according to an embodiment.

FIG. 5 is a perspective view of layers in a reserved region 500 according to an embodiment. A substrate 502 may be a bottom layer or reference layer. In an embodiment, one or more layers are designed to be fabricated over the substrate 502, and may have one or more non-metal layers and one or more metal layers. The overlays 300a . . . 300n and 340a, 340b are aligned over one another in the reserved region. Empty overlays 300a . . . 300n may be defined for each non-metal layer, and patterned overlays 340a, 340b may be defined for each metal layer. The overlays 300a . . . 300n, 340a and 340b are inserted into the template GDS file prior to designing the remainder of each layer for a die, and remain in the GDS file until reaching the fabrication facility. Thus, a standard template GDS file may be created and edited for design without requiring updating the overlays in the GDS file before or during the design phase.

Figure 6A:
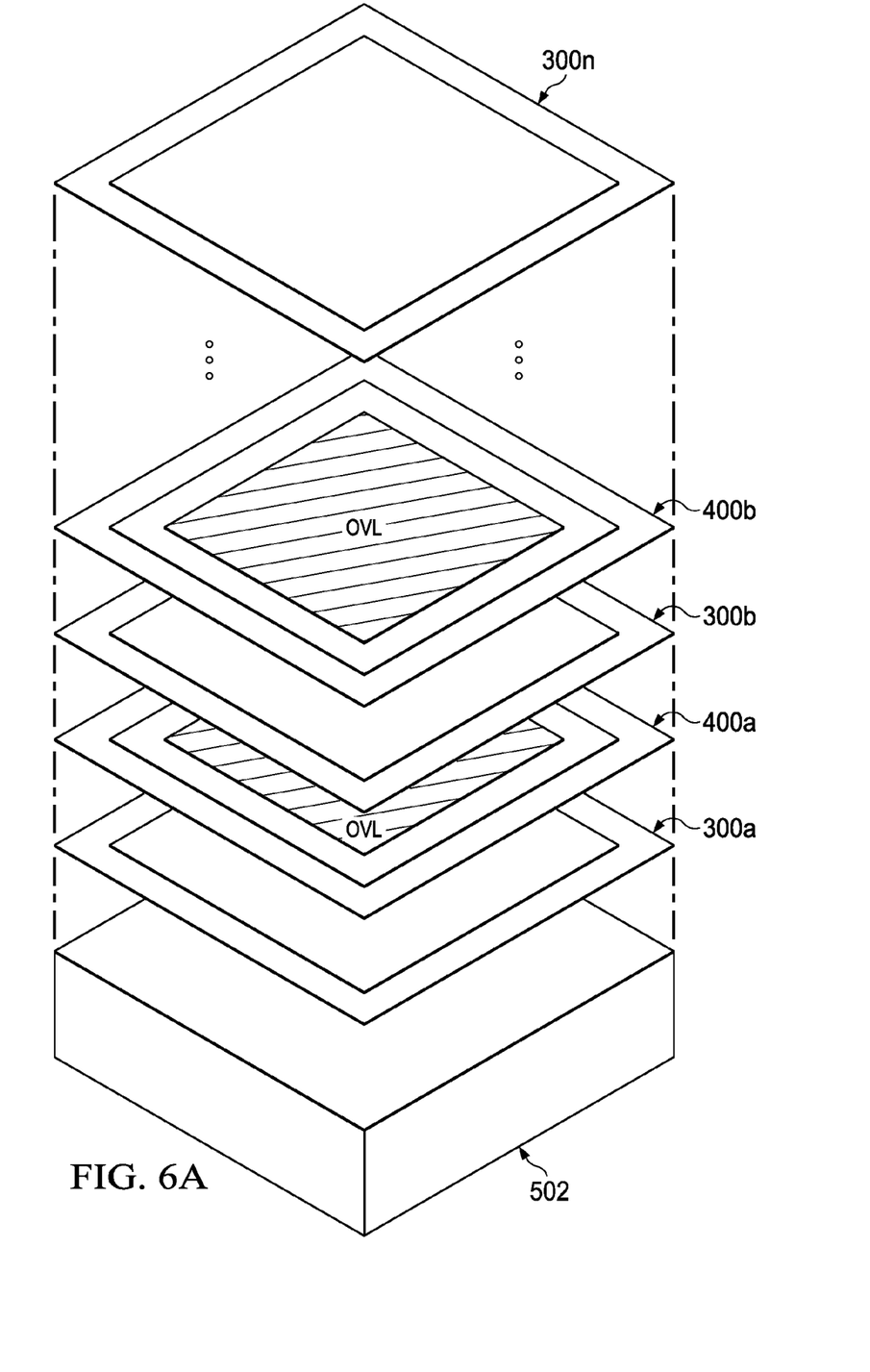
FIGS. 6A and 6B are views illustrating arrangement of production patterns according to embodiment.

FIG. 6A is a view illustrating an arrangement of production overlays 400a, 400b according to an embodiment. One or more of the patterned overlays 340a, 340b (FIG. 5) are replaced with the production overlay 400a, 400b to generate a production layer design. The empty overlay 300 in the non-metal layer permits alignment tools to "see through" the layer and to interact with the metal features in the patterned overlays 340a, 340b in layers below the empty overlay 300. In an embodiment, multiple production overlays 400a, 400b are aligned with each other in sequence, with the production overlays 400a, 400b directly over each other in adjacent layers. In another embodiment, one or more empty overlays 300a . . . 300n are disposed between the production overlays 400a, 400b.

Figure 6B:
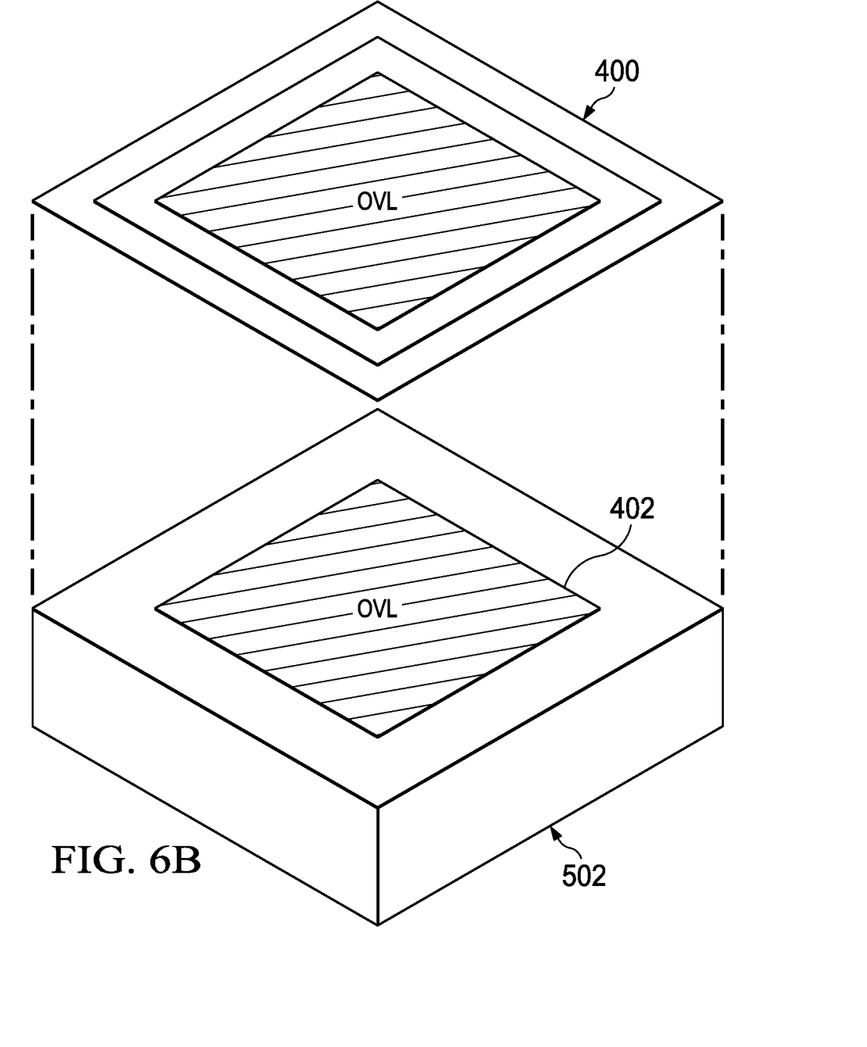

FIG. 6B is a view illustrating an arrangement of production overlays 400 according to an embodiment. In an embodiment, a production overlay 400 is used to align a layer with, for example, a substrate 502 or other structure. In an embodiment, a patterned overlay 340 (see, e.g., FIG. 4) or metal dummy pattern 342 is used to form a structure on the substrate 502, and a patterned overlay 340 is used in a layer above the substrate 502 to align, for example, an implant mask. In another example, the metal dummy pattern 342 is switched at production to a production metal pattern 402 which is used to form a mask to etch other otherwise mark the substrate 502. The production overlay 400 is then used, for example, to align a mask for patterning a photoresist for implant or the like.

Figure 7:
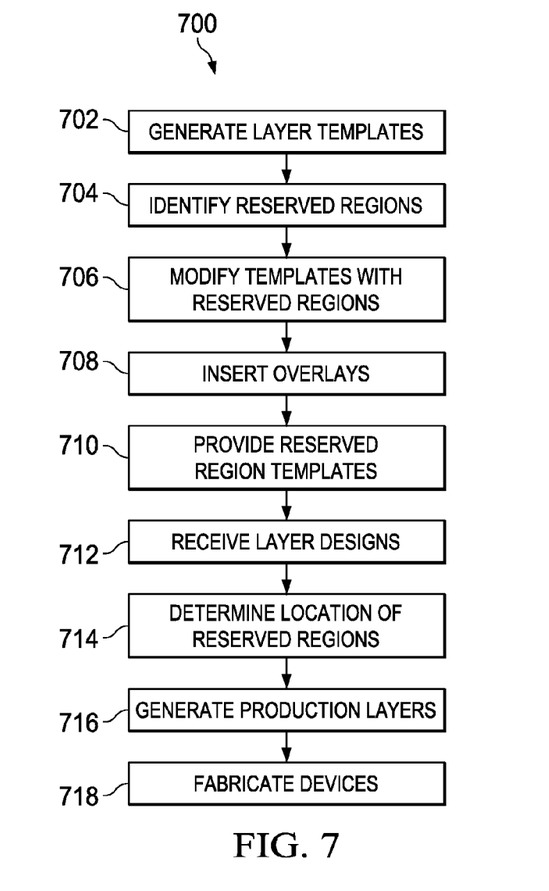
FIG. 7 is a flow diagram illustrating a method for producing an overlay design according to an embodiment.

FIG. 7 is a flow diagram illustrating a method 700 for producing an overlay design according to an embodiment. A template with one or more template layers is generated in block 702. The template layers may vary based on fabrication technique or size, fabrication tool, device topology, substrate material, or the like. Reserved regions are identified in block 704. The reserved regions may be determined based on the template, or may change in a template depending on the alignment system, fabrication system or the like. The location of the reserved regions in the template is determined or recorded so that overlays may be inserted into an overlay design file after the layers are modified during a design phase. The template is modified with the reserved regions in block 706. The reserved regions are annotated for one or more layers in the template file, the annotation, for example, indicating the boundaries of the reserved region and that the region is reserved for non-design purposes. Overlays are inserted into the reserved region templates in block 706. One or more empty overlays or patterned overlays are provided for one or more layers in the layer template. The overlays are provided, for example, by including the overlays in a library file for the template or by inserting entries into the template for the structures making up each overlay. The reserved region template is provided to designers in block 710. The reserved region templates with overlays are made available to the user designing the layers. In an embodiment, the templates are delivered via email, FTP, over the internet, or by another suitable method. The layer designs are created and received in block 712. The layer designs may be in the template files, or may be integrated into a template file so that the reserved regions are identified in the template design file, through for example, a reference to an external library. The reserved region locations in the layer designs are determined in block 714. The reserved region locations is determined, for example, by retrieving previously stored location data, by identifying elements in the layer design files marked as reserved regions, or another technique. Production layers are generated in block 716. The production overlays are inserted into the layer design files or otherwise associated with the reserved regions of the layer design. Devices are fabricated in block 718 according to the layer designs with the production overlays. In an embodiment, the layer design is transferred into one or more production tools and the production tools use the layer design to produce devices based on the layer design.

Figure 8:
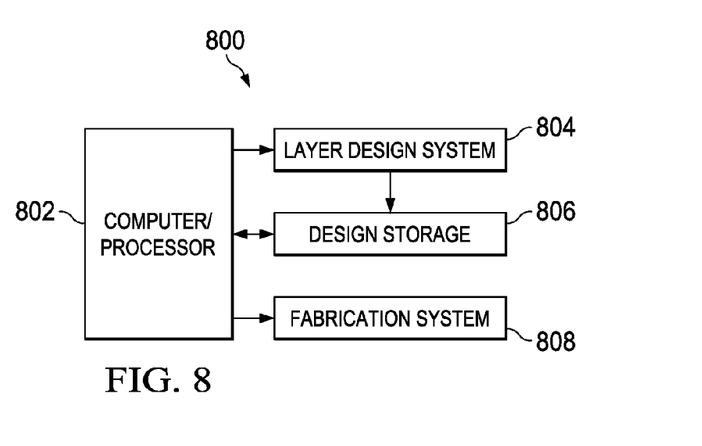
FIG. 8 is a block diagram of a system for producing a production layer design according to an embodiment.

FIG. 8 is a block diagram of a system 800 for producing an overlay design according to an embodiment. A computer or processor 802 has computer code stored on a non-transitory computer readable medium with instructions for handling and replacing the dummy overlays with production overlays. It will be understood that while the computer 800 described herein is referred to as a single computer for simplicity, one or more computers 800 may be used in conjunction or in series to perform one or more tasks described herein. In an embodiment, the computer 800 may be used to design layer layout templates. The computer 800 identifies reserved regions in the layer layout templates and stores the locations of the reserved regions in a design storage module 806. The computer 800 inserts dummy overlays such as empty overlays and patterned overlays in the different layers in the reserved region and provides the reserved region templates to a layer design system 804. In an embodiment, the layer design system 804 may be located at a remote or customer location, so that a fabrication plant can provide a template associated with a desired fabrication tool, alignment technique or production methodology. For example, a 28 nm process uses a template with a different number of reserved regions or different locations for the reserved regions than a 20 nm or 40 nm fabrication process. The layer design is sent from the layer design system 804 to the design storage module 806 where it is retrieved or accessed by the computer 800. The computer 800 replaces the dummy overlays with production overlays, where needed, by determining the location or retrieving the location of the reserved areas and removing the dummy overlays from the layer design and adding the production overlays to the layer design. In an example, the entries in a GDS file are identified by location, and any features within the boundaries of the location are removed from the GDS file and entrees reflecting the structure of the production overlays are added in the location of the reserved regions to each layer where required. The production layer designs are then sent to a fabrication system 808, and one or more devices are formed from the production layer designs.

According to an embodiment, a method for producing semiconductor devices comprises associating one or more patterned overlays with respective ones of reserved regions in a layer template, receiving a layer design based on the layer template, identifying the reserved regions in the layer design, generating a production layer design based on the layer design, the production layer design describing at least one production overlay in one of the reserved regions, and fabricating one or more devices based on the production layer design.

According to another embodiment, a system comprises a processor configured to generate production layer designs by identifying a plurality of reserved regions in layer designs based on layer templates, the layer designs having a plurality of layers, the layer designs having at least one empty overlay associated with a first reserved region in a first layer of the plurality of layers, the layer designs having at least one patterned overlay described therein and associated with a second reserved region in a second layer of the plurality of layers. The system is further configured to replace the at least one patterned overlay with at least one production overlay to generate production layer designs based on the layer designs, the at least one production overlay describing a pattern different from a pattern described by the at least one patterned overlay. The system further comprises at least one fabrication tool configured to fabricate one or more devices using a mask corresponding to the production overlay, the one or more devices based on the production layer designs and having a structure corresponding to the mask.

According to an embodiment, a software product is embodied on a non-transitory computer readable medium and has instructions causing a computer processor to execute a method comprising identifying a first reserved region in a first layer template and a second reserved region in a second layer template, associating at least one empty overlay with the first reserved region and at least one patterned overlay with the second reserved region, replacing the at least one patterned overlay in layer designs based on the first and second layer templates with at least one production overlay to generate production layer designs having at least one production overlay, and sending the production layer designs to a fabrication tool for fabrication of one or more devices based on the production layer designs and having a structure corresponding to the production overlay.

Although embodiments of the present disclosure and their advantages have been described in detail, it should be understood that various changes, substitutions and alterations can be made herein without departing from the spirit and scope of the disclosure as defined by the appended claims. For example, it will be readily understood by those of ordinary skill in the art that many of the features, functions, processes, and materials described herein may be varied while remaining within the scope of the present disclosure. Moreover, the scope of the present application is not intended to be limited to the particular embodiments of the process, machine, manufacture, and composition of matter, means, methods or steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
associating, by using a computer, one or more patterned overlays with respective ones of reserved regions in a layer template, wherein the reserved regions indicate locations of the layer template where circuits or devices are prohibited;
receiving a layer design based on the layer template;
identifying the reserved regions in the layer design;
generating a production layer design based on the layer design, the production layer design describing at least one production overlay in one of the reserved regions; and
fabricating, by a fabrication system, one or more devices based on the production layer design.

2. The method of claim 1, wherein a production design comprises a plurality of production layer designs, and wherein the fabricating one or more devices comprises fabricating a plurality of layers each based on at least one production layer design in the production design by aligning at least one of the plurality of layers using at least a portion of the at least one production overlay in the production layer design corresponding to the layer.

3. The method of claim 1, wherein the fabricating one or more devices comprises forming a metal pattern using at least a portion of the at least one production overlay.

4. The method of claim 1, further comprising associating one or more empty overlays with the layer template.

5. The method of claim 4, wherein the one or more patterned overlays are associated with a metal layer and wherein the one or more empty overlays are associated with a non-metal layer.

6. The method of claim 5, wherein each of the one or more patterned overlays describes one or more metal features bounded by a metal ring.

7. The method of claim 6, wherein the each of the empty overlays describes a metal ring bounding a pattern region substantially free of metal features.

8. A system, comprising:
a processor configured to generate production layer designs by:

identifying a plurality of reserved regions in layer designs based on layer templates, the layer designs having a plurality of layers, the layer designs having at least one empty overlay associated with a first reserved region in a first layer of the plurality of layers, the layer designs having at least one patterned overlay described therein and associated with a second reserved region in a second layer of the plurality of layers; and replacing the at least one patterned overlay with at least one production overlay to generate the production layer designs based on the layer designs, the at least one production overlay describing a pattern different from a pattern described by the at least one patterned overlay; and at least one fabrication tool configured to fabricate one or more devices using a mask corresponding to the production overlay, the one or more devices based on the production layer designs and having a structure corresponding to the mask.

9. The system of claim 8, wherein the processor is further configured to generate production layer designs by:

providing the layer templates having a plurality of layers;

identifying the first reserved region and the second reserved region of the plurality of reserved regions in the plurality of layers in the layer templates; and associating the at least one patterned overlay with the second reserved region.

10. The system of claim 9, wherein the identifying the first reserved region and the second reserved region comprises storing a location of the first reserved region and the second reserved region, and wherein the determining a location of the plurality of reserved regions comprises determining the location of the first reserved region and the second reserved region from the stored location.

11. The system of claim 9, wherein the structure corresponding to the mask is a metal structure.

12. The system of claim 9, wherein the structure corresponding to the mask is an implant.

13. The system of claim 8, wherein the at least one patterned overlay is associated with a metal layer and describes one or more metal features bounded by a metal ring.

14. The system of claim 8, wherein the at least one empty overlay is associated with a non-metal layer and describes a metal ring bounding a pattern region substantially free of metal features.

15. A software product embodied on a non-transitory computer readable medium and having instructions causing a computer processor to execute a method comprising:

identifying a first reserved region in a first layer template and a second reserved region in a second layer template;

associating at least one empty overlay with the first reserved region and at least one patterned overlay with the second reserved region;

replacing the at least one patterned overlay in layer designs based on the first and second layer templates with at least one production overlay to generate production layer designs having at least one production overlay; and sending the production layer designs to a fabrication tool for fabrication of one or more devices based on the production layer designs and having a structure corresponding to the production overlay.

16. The software product of claim 15, wherein the identifying the first reserved region and the second reserved region comprises storing a location of the first reserved region and the second reserved region, and wherein the replacing at least one patterned overlay comprises retrieving the location of the first reserved region and the second reserved region.

17. The software product of claim 15, further comprising associating the at least one patterned overlay with a metal layer, wherein the at least one patterned overlay describes one or more metal features bounded by a metal ring.

18. The software product of claim 15, further comprising associating the at least one empty overlay with a non-metal layer, wherein the at least one empty overlay describes a metal ring bounding a pattern region substantially free of metal features.

19. The software product of claim 15, wherein the at least one production overlay describes a pattern different from a pattern described by the at least one patterned overlay.

20. The software product of claim 15, wherein the at least one production overlay is aligned directly over the at least one empty overlay.

* * * * *